Aug. 6, 1929.   A. R. STEVENSON, JR   1,723,090
VOLTAGE REGULATING SYSTEM
Filed July 2, 1925
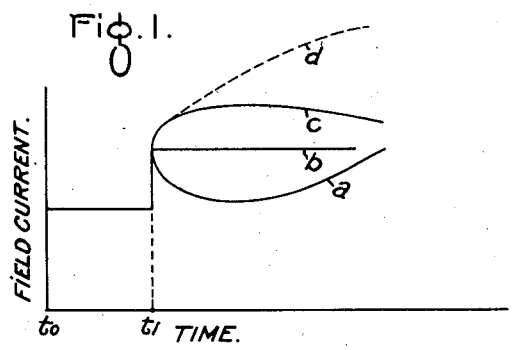
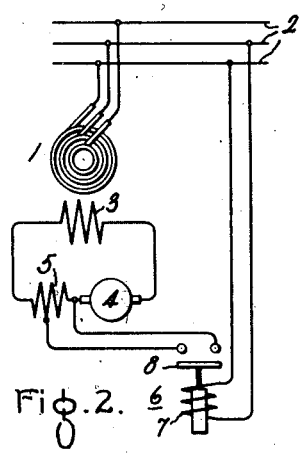
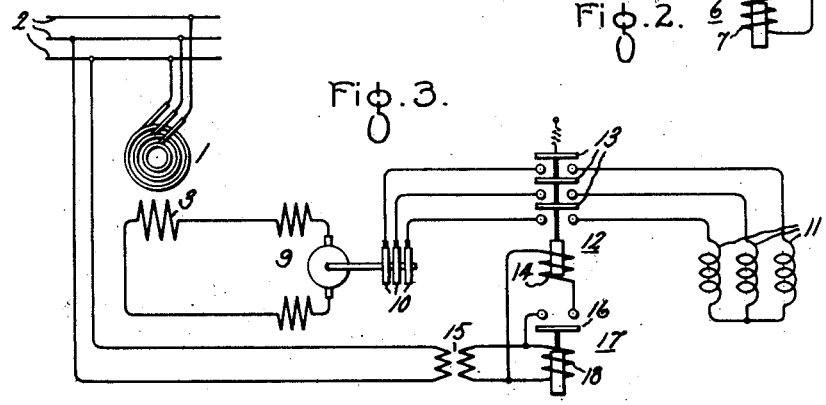
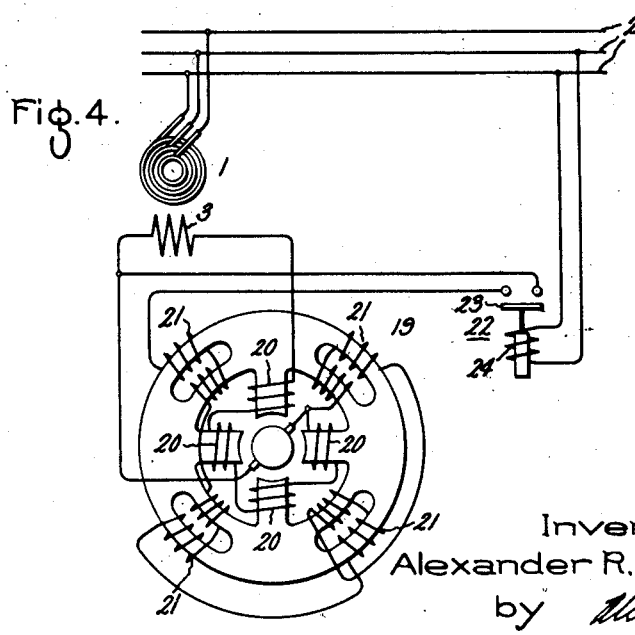
Inventor:
Alexander R. Stevenson, Jr.
by
His Attorney.

Patented Aug. 6, 1929.

1,723,090

UNITED STATES PATENT OFFICE.

ALEXANDER R. STEVENSON, JR., OF SCHENECTADY, NEW YORK, ASSIGNOR TO GENERAL ELECTRIC COMPANY, A CORPORATION OF NEW YORK.

VOLTAGE-REGULATING SYSTEM.

Application filed July 2, 1925. Serial No. 41,185.

My invention relates to the excitation of alternating-current machines, and more particularly to voltage regulation of synchronous alternating-current machines used in connection with high-voltage, long-distance power transmission systems.

The voltage stability of the synchronous machines of a transmission system becomes a predominating factor in connection with the problem of transmitting electrical energy over long distances. In a long transmission line the critical load for stable operation may be reached before the economic load is attained. That is, when transmitting any load up to the desired maximum load, it may be necessary to have generating apparatus with little or no voltage change, at least; to have the voltage restored to its normal value quickly on sudden changes of load; otherwise, the synchronizing force between the synchronous machines of the system may be greatly weakened, so that the machines become unstable and fall out of synchronism with the system.

When a short circuit or a sudden, relatively large increment of load is thrown on a line, the alternator field current is increased corresponding to the increase in armature current, and then dies off as a transient. This increase in field current is due to the change in armature reaction which induces a corresponding current in the field to balance the armature reaction. Generally, the tendency of the field current to rise is undesirable because it results in a very high initial current unless the field transient is of relatively short duration. With highly reactive circuits, such as a long transmission line, the problem of controlling the value of the short circuit current is not a controlling factor and it is desirable to maintain the field current transient for periods that would be detrimental to the ordinary operation of synchronous machines, in order that the synchronous machines may be operated with stability and remain in synchronism with the system.

Many arrangements have been proposed and utilized for regulating the excitation of synchronous machines, among which may be mentioned the regulation with a Tirrill or vibratory type of regulator or some method of compensation or compounding by rectifying a portion of the load current and supplying added excitation to a separate winding on the alternator or influencing the excitation of the main exciter.

The deficiencies of the usual methods of voltage regulation, particularly for synchronous machines interconnected with long transmission lines, may be attributed to the fact that the desired change in the excitation circuit does not occur instantaneously with load change. For instance, in the vibratory type of regulator, the voltage must first change and cause a change in the setting of the contacts before a corresponding change in the exciting current takes place. With many methods of compounding, the self-induction of the exciter field and the main generator field delays the increase in excitation which is necessary to maintain the voltage constant.

An object of my invention is to provide an improved regulating means and an improved method whereby the voltage of an alternating current machine may be maintained substantially constant irrespective of sudden variations in load current.

In accordance with my invention, I provide means for increasing the time constant of the excitation circuit of synchronous alternating-current machines, and thereby cause the field transient to be of long duration, in order that the field flux may be sustained in spite of the increased armature reaction under short-circuit or suddenly increased loads. The time constant of a circuit is determined by the relative values of the constants of the circuit, and in the usual excitation circuit, is determined by the ratio of the inductance to the resistance. It will thus be observed that the time constant may be increased by increasing the inductance or by decreasing the resistance. Preferably, I increase the time constant of the excitation circuit by providing therein an excitation element, such as an unsaturated series exciter, which will have a voltage rise across it proportional to the current flowing in it and in a direction to aid the flow of current, said excitation element being designed so that the field transient on sudden load will tend to rise exponentially; said element being regulated to prevent an indefinite increase and limit the duration of the field transient when the voltage of the alternating-current machine reaches its normal value.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which Fig. 1 is a diagram showing the relation between field current and time for suddenly increased alternator loads when the time constant of the alternator excitation circuit has different values; Fig. 2 illustrates an embodiment of my invention in its simplest form as applied to an alternator supplying a transmission line. Fig. 3 illustrates a modification thereof, in which the direct regulation of the current in the field of the main exciter is obviated, and Fig. 4 is a further modification using an auxiliary winding for influencing the magnetic circuit of the main exciter.

From the standpoint of losses, the resistance of an alternator field circuit is usually kept as low as reasonably possible, but it has not heretofore been thought desirable to reduce the effective resistance to a very small value because of the possibilities of instability or the growth of field transients of long duration resulting in high initial short-circuit current. In order to increase the duration of the field transient, under certain conditions hereinbefore pointed out, I change the effective resistance of the excitation circuit by introducing an element therein which will have a voltage rise across it proportional to current flowing in it, and in a direction to aid the flow of current, that is to say, an element with a negative resistance characteristic, and this element is arranged to provide a voltage more than sufficient to overcome the ohmic resistance drop of the excitation circuit.

Referring to Fig. 1, curve "$a$" indicates the condition of the field current in an excitation circuit when operated under the usual conditions. The horizontal line from $t_0$ to $t_1$ represents the field current under steady-state conditions. When load is suddenly thrown on the alternator at $t_1$, the field current rises momentarily as previously pointed out and then dies off rapidly until after a certain time interval when it is increased to the proper value by the action of a regulator or compounding device.

Curve "$b$" represents the condition in the excitation circuit when an element with a negative resistance characteristic has been introduced in the circuit so that the equivalent negative resistance is nearly equal to the positive or ohmic resistance.

Curve "$c$" represents the condition in the excitation circuit when an element with a negative resistance characteristic has been introduced in the circuit in accordance with my invention so that the equivalent negative resistance is substantially higher than the positive or ohmic resistance. However, in accordance with my invention the element introduced is controlled by regulating means so that the rise of current is not indefinitely increased as indicated by the dotted curve "$d$" which represents the condition that would obtain in the excitation circuit if the regulating means were not used.

Referring to Fig. 2, a synchronous dynamo-electric machine 1, shown as a three phase alternator, supplies power to a long transmission line 2, which for simplicity is shown as directly connected to the alternator. The connection will ordinarily be made through transformers. The field winding 3 of the alternator is energized by means of a direct-current series-wound exciter 4, operated unsaturated and provided with laminated poles so as to provide a quick-acting source of excitation capable of providing an equivalent negative resistance substantially greater than the ohmic resistance of the alternator excitation circuit. The field winding 5 of the exciter 4 may be controlled by a sensitive vibratory-type of regulator, for example a Tirrill regulator, to insure steady operation. For purposes of illustration, a device diagrammatically represented as a relay 6 is shown as the regulating means. The relay 6 is provided with controlling coil 7 energized in accordance with the line voltage, and a contact 8, arranged to shunt a portion of the field winding 5 when the line voltage reaches a predetermined value.

Under operating conditions, the system will be regulated so that when the terminal voltage of the alternator 1 is below some predetermined value, the series exciter 4 will have an equivalent negative resistance substantially higher than the positive or ohmic resistance of the entire excitation circuit. Under these conditions, the field current for a sudden load change would tend to rise exponentially until the effect of saturation reduced the equivalent negative resistance. It would not be practicable to operate the system under such a condition of field current transients; but in the present system this tendency of the field current to increase indefinitely is removed by the operation of the regulator 6 which shunts a portion of the current from the field winding 5 of the exciter 4, reducing the equivalent negative resistance as soon as the voltage of the alternator exceeds a predetermined value.

With generating units of great capacity, the field currents may be so great as to require large contactor units having considerable inertia which will tend to prevent rapid operation. Under such circumstances, it may be found desirable to arrange the apparatus as shown in Fig. 3, wherein the field winding 3 of alternator 1 is energized by means of a series-wound exciter which is of the rotary converter type provided with slip rings 10. The slip rings 10 are arranged to be connected to a Y-connected reactive load illustrated by inductive coils 11 when the contacts 13 of contactor 12 are in the lower position. The coil 14 of relay 12 is energized from the secondary of transformer 15 when its circuit is completed by contact 16 of relay 17. The coil 18 of relay 17 is also energized from the secondary of transformer 15, the primary of which is connected to be energized in accordance with the line voltage.

In general, the operation of the system shown in Fig. 3 is similar to the system shown in Fig. 2 in so far as it is arranged to produce an effective resistance in the excitation circuit to obtain a field transient of long duration. Assume that coil 18 of relay 17 is sufficiently energized so that the energizing circuit of coil 14 of relay 12 has moved the contacts 13 to the lower position. The slip rings 10 will then be connected to the inductive load 11. When load is thrown on the alternator, the voltage will drop causing relay 17 to open and thereby open the circuit of coil 14 of relay 12. The contacts 13 will move to the open position toward which they are normally biased. The exciter will then build up rapidly to provide an equivalent negative resistance in the excitation circuit substantially greater than the positive or ohmic resistance.

As soon as the alternator voltage reaches the desired value, relay 17 will close and thereby complete the energizing circuit of coil 14 of relay 12, moving contacts 13 to the lower position and completing the polyphase inductive circuit to the exciter slip rings 10. This lagging polyphase load impressed on the slip rings 10 of the exciter 9 will have a demagnetizing armature reaction causing the induced voltage of the exciter to decrease affording a regulation similar in effect to shunting a portion of the series field current as in Fig. 1.

In Fig. 4 I show a modification utilizing a special type of series exciter. The field winding 3 of alternator 1 is energized by means of a series-wound exciter 19 provided with the usual field winding 20 and an auxiliary winding 21 positioned on the field yoke between the usual field poles. The auxiliary winding 21 is connected across the terminals of the exciter and its energization will be controlled by a relay 22 provided with a contact 23 and a coil 24 energized in accordance with line voltage. To accommodate this auxiliary winding, the yoke may be slotted intermediate the field poles and the winding will be arranged and connected so as to have no mutual inductance with either the main field coils or the armature circuit. This auxiliary winding will be instrumental in saturating a part of the magnetic circuit of the exciter.

The underlying principle of regulation is the same as previously outlined but in the arrangement just described, the field transient is prevented from increasing indefinitely by regulating the degree of saturation of the field yoke of the exciter. When contact 23 of relay 22 is in its upper position, the auxiliary field circuit is included so that the degree of saturation of the yoke is regulated properly to control the voltage across the terminals of the alternator field winding 3. When load is suddenly thrown on the alternator, contact 23 of relay 22 opens the circuit of the auxiliary field winding and the exciter operates in such a manner as to maintain the equivalent negative resistance substantially greater than the positive or ohmic resistance of the entire excitation circuit, in order that the field current may continue to increase until the normal voltage of the alternator is restored.

What I claim as new and desire to secure by Letters Patent of the United States, is:—

1. The method of sustaining the voltage of a synchronous dynamo-electric machine comprising an excitation circuit in which a transient current is produced by armature reaction when said machine is subjected to a sudden increase of load, which comprises increasing the ratio of the inductance to the resistance of the excitation circuit sufficiently upon the occurrence of the increase in load to cause the transient current to have an incipient exponential rise, and then decreasing the ratio of the inductance to the resistance of the excitation circuit when the voltage of said synchronous machine reaches a predetermined value to limit the duration of said transient current to such a value as to maintain the voltage of said synchronous machine substantially at its normal value.

2. The method of regulating the voltage of a synchronous dynamo-electric machine comprising an excitation circuit, which consists in first decreasing the effective resistance of the excitation circuit upon a sudden increase of load so that the current transient induced in said excitation circuit by said increase of load will have an incipient exponential rise, and then increasing the effective resistance of said excitation circuit to limit the rise of said transient current to such a value as to maintain the voltage of said synchronous machine substantially at its normal value.

3. The combination of a synchronous dynamo-electric machine comprising a field circuit, means for energizing said field circuit and for increasing the time constant of said excitation circuit whereby the field current transient induced on sudden change of load upon said synchronous machine will have an incipient exponential rise, and means for controlling the duration of said field transient and for decreasing said rise when the voltage of said synchronous machine reaches a predetermined value.

4. The combination of an alternator comprising armature and field circuits, a transmission line connected to said armature, an unsaturated quick-acting series-wound exciter for energizing said field circuit, and a regulator responsive to the voltage of said alternator for adjusting the voltage of said exciter to provide an equivalent negative resistance substantially greater than the ohmic resistance of the entire excitation circuit when the alternator voltage falls below its normal value.

5. The combination of a synchronous dynamo-electric machine comprising a field circuit, a series-wound exciter for energizing said field circuit and for maintaining an equivalent negative resistance substantially greater than the ohmic resistance of the entire excitation circuit when the voltage of said synchronous machine falls below a predetermined value, and means for reducing the field flux of said exciter when the voltage of said synchronous machine reaches a predetermined value.

6. The combination of an alternator comprising armature and field circuits, a transmission line connected to said armature circuit, a series-wound exciter connected to said alternator field circuit for maintaining an equivalent negative resistance substantially greater than the ohmic resistance of the entire excitation circuit when the voltage of said alternator falls below a predetermined value, auxiliary means for varying the field flux of said exciter, and a regulator responsive to the voltage of said alternator for controlling said auxiliary means so as to decrease the exciter field flux when the voltage of said alternator reaches a predetermined value.

7. The combination of a synchronous dynamo-electric machine comprising a field circuit, a series-wound exciter for energizing said field circuit and for maintaining an equivalent negative resistance substantially greater than the ohmic resistance of the entire excitation circuit when the voltage of said synchronous machine falls below a predetermined value, and means for saturating the field yoke intermediate the field poles of said exciter when the voltage of said synchronous machine reaches a predetermined value.

8. The combination of an alternator comprising armature and field circuits, a transmission line connected to said armature circuit, a series-wound exciter connected to said alternator field circuit for maintaining an equivalent negative resistance substantially greater than the ohmic resistance of the entire excitation circuit when the voltage of said alternator falls below a predetermined value, an auxiliary field winding intermediate the field poles of said exciter, and a regulator responsive to the voltage of said alternator for controlling the excitation of said auxiliary field winding so as to decrease the exciter field flux when the voltage of said alternator reaches a predetermined value.

In witness whereof, I have hereunto set my hand this 1st day of July, 1925.

ALEXANDER R. STEVENSON, Jr.